United States Patent
Cary et al.

(10) Patent No.: US 9,679,606 B2
(45) Date of Patent: Jun. 13, 2017

(54) METHOD OF MODIFYING PLAY OF AN ORIGINAL CONTENT FORM

(75) Inventors: Judson D. Cary, Denver, CO (US); Frank Sandoval, Louisville, CO (US); David E. Agranoff, Golden, CO (US); David K. Broberg, Lafayette, CO (US); Stephen G. Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1116 days.

(21) Appl. No.: 13/232,117

(22) Filed: Sep. 14, 2011

(65) Prior Publication Data

US 2013/0064525 A1    Mar. 14, 2013

(51) Int. Cl.

| | |
|---|---|
| *G11B 27/00* | (2006.01) |
| *G06F 3/00* | (2006.01) |
| *G06F 15/16* | (2006.01) |
| *G09G 5/00* | (2006.01) |
| *G11B 27/031* | (2006.01) |
| *G11B 27/34* | (2006.01) |
| *G06F 3/14* | (2006.01) |
| *G11B 27/10* | (2006.01) |
| *G06Q 30/02* | (2012.01) |
| *H04N 21/84* | (2011.01) |
| *H04N 21/462* | (2011.01) |
| *H04L 29/06* | (2006.01) |

(52) U.S. Cl.
CPC .......... *G11B 27/031* (2013.01); *G06F 3/1446* (2013.01); *G06Q 30/02* (2013.01); *G11B 27/105* (2013.01); *G11B 27/34* (2013.01); *H04L 29/06027* (2013.01); *H04N 21/4622* (2013.01); *H04N 21/84* (2013.01)

(58) Field of Classification Search
CPC ....... G11B 27/34; G06F 3/1446; G09G 3/002; H04L 29/06027; H04N 21/4622; H04N 21/84
USPC ...... 386/285, 278; 345/1.2, 1.5; 348/E5.105; 707/E17.028, E17.121; 709/231; 715/201; 725/39, 44
See application file for complete search history.

(56) References Cited

U.S. PATENT DOCUMENTS

| | | | |
|---|---|---|---|
| 6,750,830 B1* | 6/2004 | Teshima | G06F 17/30905 345/1.2 |
| 8,081,870 B2* | 12/2011 | Ito | H04N 5/4401 386/278 |
| 2002/0049971 A1* | 4/2002 | Augenbraun | H04N 5/44543 725/39 |
| 2005/0193425 A1* | 9/2005 | Sull | G06F 17/30817 725/135 |

(Continued)

*Primary Examiner* — Thai Tran
*Assistant Examiner* — Syed Hasan
(74) *Attorney, Agent, or Firm* — Great Lakes Intellectual Property, PLLC.

(57) ABSTRACT

A method of facilitating modified content play such that modification actions may be implemented during play of original content form. The modification actions may be specified by users to modify the original content form. The modification may be disseminated to subscribers or other users desiring similar content modifications. The method may be useful in social networking systems to allow social members to share commentary and otherwise modify original content forms to include their personal reflections.

1 Claim, 4 Drawing Sheets

(56) References Cited

U.S. PATENT DOCUMENTS

2009/0164652 A1\* 6/2009 Slobotskoy ............ H04N 5/783
709/231

\* cited by examiner

METHOD OF MODIFYING PLAY OF AN ORIGINAL CONTENT FORM

TECHNICAL FIELD

The present invention relates to modifying an original content form, such as by allowing a user to specify modification actions to be implemented during play of the original content form.

BACKGROUND

Content distribution methods typically distribute the entire original form of content to end users, e.g., a movie, a sports game, a TV show. Modified content is also typically distributed in its entirety, e.g., a director's him cut version, a "PG" version for kids, a highlights reel, or a trailer, of original content. Additionally, end users often want to create their own edited version or highlights reel of original content (e.g., of a sports game). And, social networking has enabled the ability to share content, and modified content, amongst members of the social network. The inventors of the present invention have enabled a simple method to share modified content without necessarily distributing such modified content; rather, a unique identifier of the original form content, plus a series of defined edits or actions at defined offsets is delivered or otherwise accessed or made available. The present invention thus saves on bandwidth requirements for Internet service providers, download times for users, storage resources required throughout a network of devices, and avoids various copyright issues.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
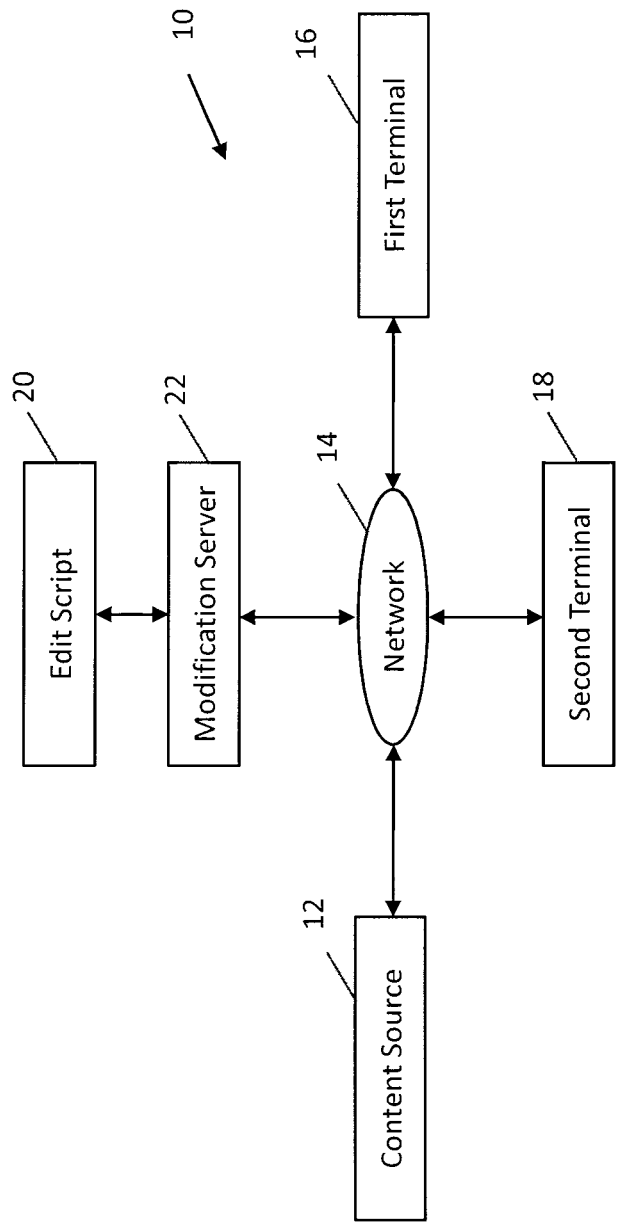
FIG. 1 illustrates a system operable for modifying play of an original content form in accordance with one non-limiting aspect of the present invention.

FIG. 1 illustrates a system 10 operable for modifying play of an original content form in accordance with one non-limiting aspect of the present invention. The system 10 is predominately described with respect to a content source 12 being operable to facilitate original content transmission over a network 14 to a first terminal 16 (and optionally a second terminal 18) for rendering. The content may be any type of electronic content suitable for electronic transmission over the network 14, such as but not limited to video, audio, or some combination thereof. As described in more detail below, the present invention contemplates facilitating modification of original content forms sourced from the content source 12 and transmitted to terminal 16 by identifying the original content form on terminal 16, and applying an edit script 20 to such original content to create modified content. The edit script 20 may be transmitted from a modification server 22 or other entity over network 14 to terminal 16 with original content, or received at a later point in time, or received from a different source, or a different network. As such, the invention allows users to modify content after transmission from the content source 12. The invention also enables user-directed edit scripts to be generated and shared, for example, over a social network or with others through some other medium.

Edit script 20 may include modifications that adjust play of the content, such as by implementing parental controls where portions of the content are skipped, deleted, blurred, or otherwise adjusted, e.g., by inserting a bleep to deafen and audio portion or inserting an overlay to obfuscate an image portion. The modifications may also include: generating a highlight reel by deleting one or more portions of a movie or television program; adding personal comments to the content, such as by inserting video clips or textural overlays in pop-up windows or bubbles; associating applications for execution at certain points within the content, e.g., to facilitate implementing insertion of dynamic advertisement applications during certain portions of a television program or movie. In general, edit script 20 includes (1) a unique identification of the original content, (2) a series of tuples for (a) a time offset within the original content, and (b) a modification or action to take. Edit script 20 can be transmitted instead of the entire modified content. This assumes the end use has the original content on terminal 16 prior to applying the edit script 20. As such the original content need only be transmitted, multiple edited versions may not need to be stored and/or transmitted. This may save on bandwidth requirements for internet service providers, download time for end users, and storage on terminal 16 or in the network 14. This method also avoids copyright issues as the original content is assumed to be legally acquired by the second user, and the first user only transmits the edit script 20.

The edit script 20 may be user-generated, or professionally crafted and received or accessed from third party sources. A user-generated edit script 20 scenario may facilitate end-user editing, and sharing, for example, in a social network. Third party provision of edit scripts 20 may be in the form of a subscription or service, for example a "good parenting" service that has already pre-defined an edit script 20 for original content to make it a PG version of the original content. Such a service might be further customizable by an end user (e.g., a parent) to edit, e.g., sex scenes, but not violence. To provide this level of granularity in producing a modified content 22, the tuple above may have additional metadata associated with the tuple, such as categories of PG factors—sex, violence, language etc. Of course, the present invention is not particular limited to any specific modifications and fully contemplates, as supported below in more detail, facilitating any number of modifications.

The content source 12 may be any type of entity sufficiently operable to facilitate transmission of electronic content to the terminals 16, and optionally 18. The content source 12 may be a cable television service provider, a broadcast television service provider, a satellite television service provider, a multiple system operator (MSO), a streaming video/audio server/service, or any other entity operable to facilitate transmission of selectable versions of available content. While the content source 12 is shown to communicate with the terminals 16, 18 over network 14, the network 14 may be a local network or the content source 12 may be part of the terminal 14, e.g., the content source 12 may be a personal video recorder (PVR) associated with one of the terminals 16, 18 or part of a home network of one of the terminals 16, 18.

The terminals 16, 18 may be any type of terminal sufficient for rendering electronic content media. The terminals 16, 18 may be, for example, a set-top box (STB), a television, a computer (desktop, laptop, tablet, PDA, etc.), a mobile phone, a media terminal adapter (MTA), a digital video recorder (DVR), etc. The terminals 16, 18 may include a display or other output through which with the content may be rendered. The terminals 16, 18 may include a user interface or other feature to facilitate interacting with a user thereof, such as to facilitate selection of the content and/or versions of the content as contemplated by the present invention. The terminals 16, 18 may include a memory, a processor, and other elements necessary to facilitate communications and other operations associated with the present invention.

The network 14 may be any type of electronic medium through which signals may be exchanged between one or more of the content source 12, modification server 22, and/or the terminals 16, 18. The network 14 may be any type of wireline or wireless network, or combination thereof, such as but not limited to a cable television network, a cellular network, a Wi-Fi network, an optical network, etc. The network 14 may be operable to support multiple types of signal transmissions, such as in-band and out-of-band transmissions. The signaling may be associated with proprietary type signaling, such as that used to transmit television signaling to a STB, where data is transmitted within MPEG or other video transmission packets, i.e., with the content transmission. The signaling may be associated with non-proprietary signaling, such as that used to facilitate packet-based communications over non-proprietary networks, e.g. IP-based communications carried out over the Internet. Optionally, the signaling may be used by the content source 12 to communicate with the terminals 16, 18 and the signaling may be used by the terminals 16, 18 to communicate with each other.

A modification server 22 may be included to facilitate implementing the modifications contemplated by the present invention. The modification server 22 may include a relational database or other computer-readable medium sufficient to store modification actions selected by users for use in facilitating subsequent modification of original content forms. The modification server 22, for example, may be configured to generate an edit script based on inputs received from a user. The schedule may then be used to facilitate modifying subsequent play of the corresponding content in a modified form. The modification server 22 is shown to be separate in order to demonstrate one non-limiting aspect of the present invention where the modification server is an independent entity associated with implementing the modifications contemplated herein. However, the present invention fully contemplates the modification server being part of or associated with any other entity, including the content source 12 and/or the terminals 16, 18.

Figure 2:
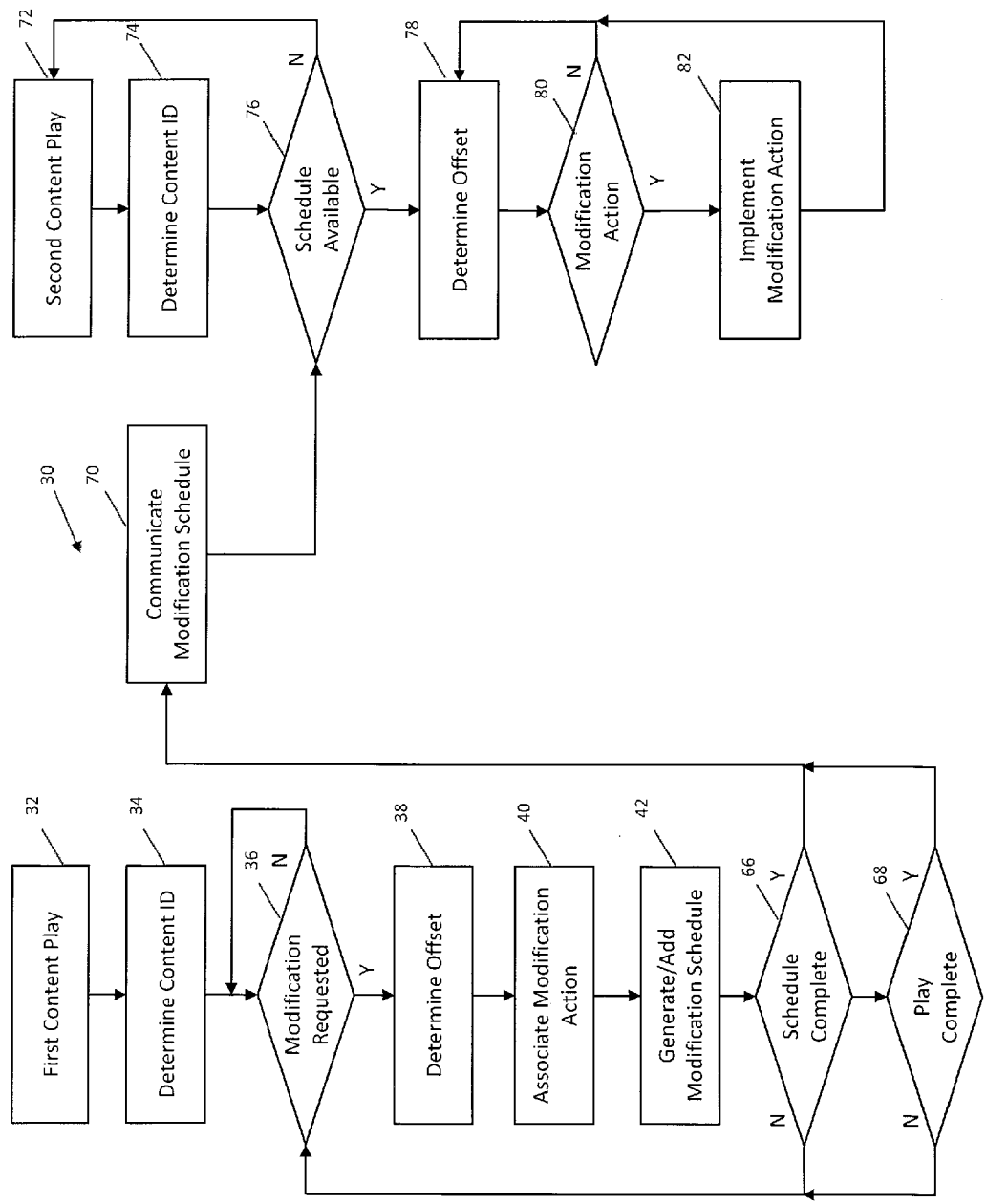
FIG. 2 illustrates a flowchart of a method of modifying play of an original content form in accordance with one non-limiting aspect of the present invention.

FIG. 2 illustrates a flowchart 30 of a method of modifying play of an original content form in accordance with one non-limiting aspect of the present invention. The method is predominately described with respect to facilitating modification of a television program or other video where a first user requests a number of modification actions to be implemented during subsequent play of the television program, such as when played again by the first user or by a second user. The present invention, however, is not necessarily limited to only facilitating modification of television programs or movies and fully contemplates facilitating modification of any type of electronic media, including but not limited to the media originating from sources other than the content source 12, e.g., one of the terminals 16, 18, a streaming Web server, or other location, as well as and the media being audio or static images.

Block 32 relates to a first content play. The first content play may correspond with play of the television program at the first terminal 16 for a first user, such as but not limited to a subscriber of the content source 20 and/or a "professional" editing service employee. The first content play may be facilitated through a set-top box (STB), such as by selecting a television channel for viewing through an electronic programming guide (EPG), or through some other interactive platform where the first user navigates to a request particular television program for play. The selected content may be played through an output device, such as a television or a computer, for output to the user. The terminal 16 being used to facilitate output may include capabilities to facilitate user interactions during content play and/or an application or other device may be otherwise used to interact with the first user during play, e.g., a tablet application may be used to interact with the user while the user views the television program on a television or other device lacking sufficient user interactivity.

Block 34 relates to determining a content ID for the first content play. The content ID may be a unique ID associated with the content, and in some cases, a particular version of the content. The content ID may be determined from a resource server or other registering entity, such as in the manner described in the U.S. patent application Ser. No. 13/228,824, filed Septem's enti, 2011, entitled "Version Selective Content Delivery", the disclosure of which is hereby incorporated by reference in its entirety. (Commercial content registries are available from, for example, Entertainment ID Registry (EIDR) or ISAN.) Optionally, the content ID may be determined from information embedded with the television program or from non-embedded information, such as from a relationship defined by the EPG according to a tuned to channel and a time of day.

Block 36 relates to determining whether the first user has requested a modification action. The modification action may correspond with any action desired by the first user to be included during subsequent, modified playback of the television program so as to modify the original content form. For exemplary and non-limiting purposes, the method is described with respect to the first user selecting the modification actions according to a plurality of parental control modification actions. The parental control modification actions may include actions associated with skipping portions of the television program, adding a bleep or other audio deafening feature, blurring or blocking certain portions of the television program, and deleting portions of the television program. The user may add additional metadata at this time as well, for example, information regarding "why" the edit was made. In the case of parental controls, it might be for violence, sex, language, etc. This information forms the (1) time offset, (2) edit-action, and (optionally) (3) metadata "tuple". In replay or use by a second user, the second user can then choose from a menu of metadata which tuples are used to modify the content. For example, a second user may be OK with violence and language, but not sex, for their children. The present invention, however, is not necessary limited to facilitating parental control type modification actions and fully contemplates facilitating virtually any type of modification action.

A modification menu (not shown) may be provided to the first user during play of the television program. The modification menu may indicate available modification actions that may be selected during play. The modification menu may be displayed within the television or on the auxiliary device used to facilitate user interactivity. The modification menu may appear as an overlay within the output window/display within which the television program is being played so that the first user can readily identify the available modification actions. Optionally, the modification actions shown as available within the modification may be automatically adjusted by the modification server 22 depending on the content being played. If the content is a movie, parental control features may be displayed or shown more prominently than highlighting or clip selection features. If the content is of a nature where parental control is unlikely to be needed, highlighting or clip selection features may be displayed instead of or more prominently displayed than the parental control features.

Block 38 relates to determining an offset in the event the first user has requested a modification action. The offset may correspond with a temporal or other reference sufficient to identify a point during play of the television program at which the modification action is requested. The offset may be defined relative to a beginning of the television program, such as based on elapsed time or elapsed frames. The offset, for example, may be a Normal Play Time (NPT) time-stamp or derived from related NPT time-stamp information. The NPT may be a clock viewer associated with the television program which is advanced when in normal play mode (scale=1), advanced faster when in fast forward scan mode (high positive scale ratio), decremented when in scan reverse (high negative scale ratio), and fixed in pause mode.

Block 40 relates to associating the requested modification action with the determined offset in order to correlate a point within play of the original content form at which the first user desires implementation of the modification action. Block 42 relates to generating an edit script to represent each of the modification actions requested by the first user to be used in subsequently modifying the television program. The edit script may be added to during play of the television program with each successive request by the user for modification actions. The edit script may be a file or separate data entity from the television program such that it need not be embedded with the television program, i.e., it can be communicated to the modification server for use in subsequent communication to the second terminal or other entity where the television program will be subsequently modified.

Figures 3, 4:
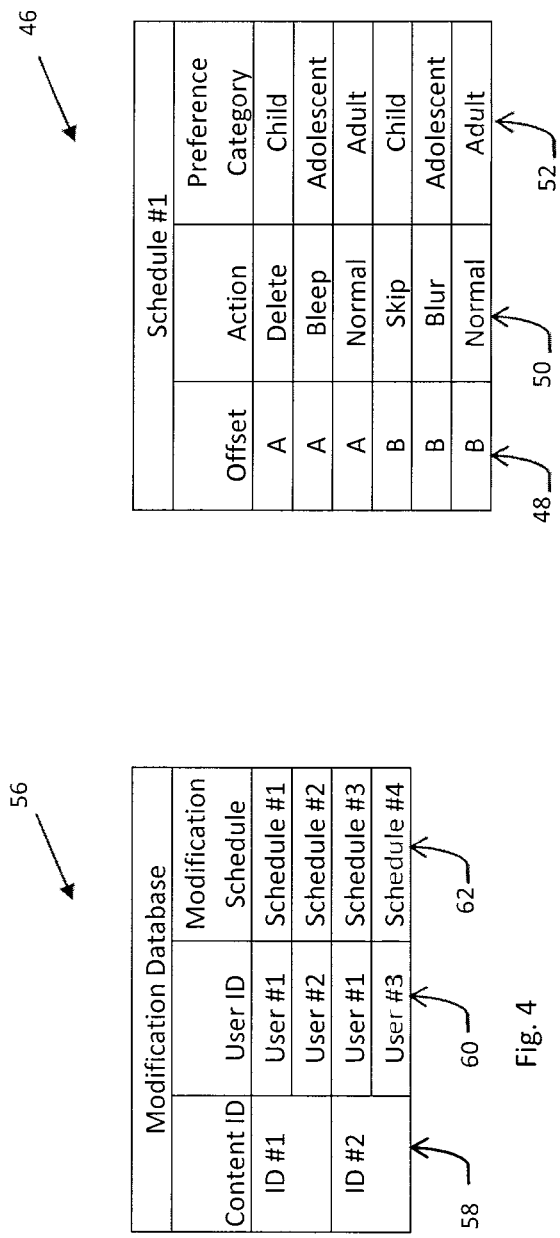
FIG. 3 illustrates an edit script contemplated by one non-limiting aspect of the present invention.
FIG. 4 illustrates a modification database contemplated by one non-limiting aspect of the present invention.

FIG. 3 illustrates an edit script 46 contemplated by one non-limiting aspect of the present invention. The schedule 46 may include a first column 48 for indicating an offset point associated with each of the modification actions provided in a second column 50. As shown, a multiple modification actions can be selected for the same offset value, i.e., or the same portion of the television program, such as to provided differentiated implementation of the corresponding modification actions. With respect to the exemplary parental control modification description provided herein, each of the parental control type modification actions may be associated with a preference category shown in a third column 52. The preference categories may be used to categorize the modification actions and in subsequently when arbitrating implementation of the one or more of the modification actions available for particular offset.

The illustrated preference categories are shown to differentiate between a child, and adolescent, and an adult. This preference differentiation may be used to facilitate modification actions specific to the desired preference category, i.e., a child, an adolescent, and an adult. With respect back to parental control modification actions, this may be helpful in allowing modification actions specific to a particular demographic. The capability to facilitate selection amongst multiple modification actions available for the same offset and/or to allow filtering according to a desired set of preferences may be beneficial in allowing the second user or other subsequent player of the modified television program to have some control over which one or more of the modification actions are implemented without having to specifically review or accept the modification actions, i.e., the second user can select a desirable set of preferences in order to automatically filter implementation of the modification actions.

FIG. 4 illustrates a modification database 56 contemplated by one non-limiting aspect of the present invention. The modification database 56 may be created and maintained by the resource server 20 to facilitate distributing edit scripts to any number of terminals or users desiring to modify original content forms based on modification actions selected by other users. The modification database may include a first column 58 for referencing that unique content ID associated with a particular piece of content for which an edit script has been created. The modification database may include a second column 60 for identifying a user that created the corresponding schedule, which may be beneficial in allowing one to select edit scripts associated with a particular user. The modification database may include a third column 62 for referencing the available edit scripts. As illustrated, multiple edit scripts may be associated with different users and available for the same or different pieces of content.

The content associated with the edit scripts may not necessarily correspond with the original form of the content transmitted from the content source 12 or other entity originating the content. For example, an edit script may be created to further modify content for which a previous edit script was created by another user such that the additional edit script may consider the original content form to correspond with content previously modified by another, as opposed to the content form when originated from the content source or other originating entity. The ability to facilitate multiple generational modifications of the content may be particularly beneficial in a social networking system in that it can be helpful in allowing subsequent users to become involved in a chain of modifications and social commentary to facilitate through additional modifications. Unique content IDs may be associated with the modified versions of the content in order to facilitate independently identifying the content and facilitating its retrieval, such as in the manner described in the U.S. patent application incorporated by reference above.

Returning FIG. 2, once at least one modification action is requested and the edit script is generated, Block 66 relates to assessing whether the edit script is complete. The edit script may be considered as complete in the event the first user desires to communicate one or more of the modification actions prior to completion of the television program, i.e., to provide commentary or other highlights to other users prior to completion of the television program. The modification actions specified in the schedule issued prior to completion of the television program may then be used by other users joining the television program in-progress or accessing the program on a time-delayed basis, such as through a personal or digital video recorder (PVR/DVR). In the event the first user has not requested completion of the edit script prior to completion of the television program, Block 68 relates to delaying communication of the modifications schedule until completion of the television program.

Once the edit script is determined to have been completed or is otherwise desired for transmission, Block 70 relates to communicating the schedule to the modification server or directly to one or more other terminals/users, such as users subscribing to the first user's blog or other social medium. Once communicated to the modification server 22 or the one or more users, the edit script may be subsequently communicated to a second terminal associated with a second user requesting modified play of the original content form of the television program. Block 72 relates to a second content play. The second content play may correspond with play of the television program at the second terminal for the second user where the second user desires modifying play of the original content form of the television program.

Block 74 relates to determining the unique content ID of the content being played in Block 72. Block 76 relates to determining whether an edit script is available for the content play. The available edit script may be determined based on the content ID determined in Block 74 being related to content IDs included within the modification database of the modification server. If multiple edit scripts are available, the second user may be provided with an option to select the desired edit script and/or to ignore all the edit scripts in favor of playing the content in the original content form. Assuming the second user has selected one of the edit scripts to be used in modifying play of the content, Block 78 relates to determining offsets during the second content play.

The offsets determined in Block 78 may be based on the NPT or with universal identifying scheme so that information need not be recovered or decoded from the content being played. Rather, the offsets may be determined based on an elapsed time from the beginning of the content play, which may be tracked by the second terminal or the application/tablet being used to facilitate user interactions with the second terminal. The ability to separately track the offsets without having to decode certain pieces of information from the content play may be helpful in providing a ubiquitous process to identifying when modification actions specified in the edit scripts are to be implemented so that the modification actions can be implemented across multiple device platforms and operating systems without having to be uniquely adjusted to the particular requirements associated therewith.

Block 80 relates to determining whether the selected edit script includes a modification action specified for the current offset. In the event a modification action is included, and optionally the modification action corresponds with or is not in conflict with the preference category selected by the second user, the corresponding modification action may be implemented in Block 82. The present invention contemplates specifying the modification actions in a ubiquitous manner so that modification actions may be implemented across multiple device platforms and operating systems without the modification actions having to be specifically adjusted to the particular requirements associated therewith. Of course, the present invention is not necessarily limited to any particular scheme for defining the modification actions and fully contemplates having dedicated modification actions or multiple instructions for certain modification actions depending on the requirements of the outputting terminal.

In the event the modification actions are to be implemented at the terminal supporting the second play, the modification action may be executed according to instructions included within the edit script and/or otherwise indicated by information associated therein. Optionally, the modification actions may be performed remotely from the second terminal prior to being delivered to the second terminal for play, such as at the content source 12 or the resource server 20. This "upstream" modification may be beneficial in ameliorating processing demands on the second terminal and/or facilitating modified play at terminals for which the modification actions may not be supported or for which the means to instruct the terminals to perform the modification actions may be too onerous.

Figure 5:
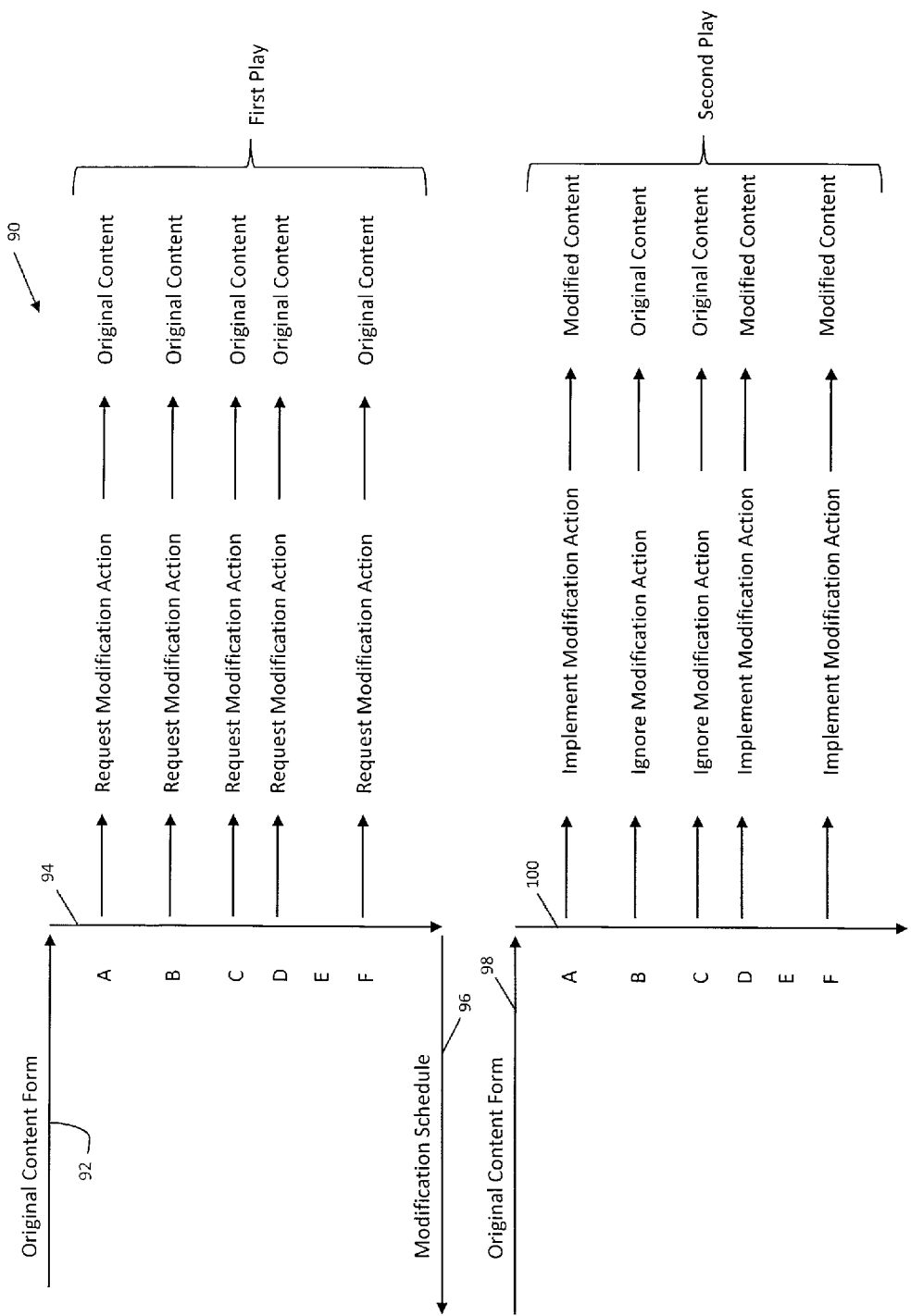
FIG. 5 schematically illustrates modifying play of an original content form as contemplated by one non-limiting aspect of the present invention.

FIG. 5 schematically illustrates a graph 90 for the method contemplated by one non-limiting aspect of the present invention. A first line 92 indicates transmission of an original content form to a first terminal for a first play. A second line 94 indicates offsets occurring during play of the content relative to markers A, B, C, D, E, and F. As shown, modification actions were requested for portions of the original content form corresponding with offsets A, B, C, D, and F. Thereafter, a third line 96 indicates communication of an edit script generated to correspond with the requested modification actions. A fourth line 98 represents transmission of the original content form transmitted in the first line being received at a second terminal requesting a second play according to the edit script associated with the third line. A fifth line 100 indicates the offsets during the second play corresponding with those of the first play and any modification actions associated therewith, including whether the modification action was accepted for implementation or ignored.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of modifying play of an original content form, the original content form being embodied in a plurality of frames, the frames facilitating audio and moving images during play, the method comprising:

determining a unique ID for the original content form;

determining one or more temporal offsets for the original content form;

determining one or more modification actions to be implemented at the one or more temporal offsets;

associating the one or more temporal offsets and the one or more modification actions with the unique ID determined for the original content form;

transmitting an edit script to a terminal transmitted the original content form for the edit script detailing the one or more temporal offsets and the one or more modification actions associated with the unique ID;

facilitating implementation of the edit script at the terminal during play of the original content form, the one or more modification actions causing the terminal to modify play of the original content form such that audio and/or images included in the frames transmitted to the terminal as part of the original content form are subsequently modified by the terminal during play pursuant to the one or more modification actions;

assigning a metadata to one or more of the one or more modification actions, the assigned metadata defining one of a plurality of preference categories descriptive of a nature of the corresponding modification action;

determining one or more preferred preference categories of a user desiring modifying play of the original content form; and preventing implementation of modification actions assigned preference categories in conflict with the preferred preference categories.

* * * * *